(12) United States Patent
Wong et al.

(10) Patent No.: US 6,874,208 B2
(45) Date of Patent: Apr. 5, 2005

(54) ANCHORING ATTACHMENT APPARATUS

(75) Inventors: Samuel Wong, Troy, MI (US); Jamie J. Rawlings, Leamington (CA); Rachel E. Thomas, Clarkston, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/808,221

(22) Filed: Mar. 14, 2001

(65) Prior Publication Data

US 2002/0129468 A1 Sep. 19, 2002

(51) Int. Cl.[7] ............................................. A44B 21/00
(52) U.S. Cl. ................................. 24/265 R; 24/265 AL
(58) Field of Search .............................. 24/163 R, 170, 24/190, 191, 194, 197, 198, 200, 265 BC, 265 AL, 265 EC, 309–313, 323; 280/801.1, 808, 728.2, 743.2; 297/468, 472, 483

(56) References Cited

U.S. PATENT DOCUMENTS

| | | | | | |
|---|---|---|---|---|---|
| 2,082,828 | A | * | 6/1937 | Garris .............................. 87/8 |
| 4,043,581 | A | * | 8/1977 | St. Germain ................. 294/74 |
| 4,239,271 | A | * | 12/1980 | Beasley et al. ................ 294/74 |
| 4,240,659 | A | * | 12/1980 | St. Germain ................. 294/74 |
| 4,315,637 | A | * | 2/1982 | Frantom ................... 280/801.1 |
| 4,414,712 | A | * | 11/1983 | Beggins ................... 241/129 R |
| 5,339,498 | A | * | 8/1994 | Parsons ..................... 24/129 R |
| 5,533,746 | A | | 7/1996 | Whited |
| 5,536,066 | A | * | 7/1996 | Sedlack ................... 297/250.1 |
| 5,636,862 | A | | 6/1997 | Cheung et al. |
| 5,848,667 | A | * | 12/1998 | Davidson ..................... 182/190 |
| 6,203,056 | B1 | | 3/2001 | Labrie et al. |
| 6,301,753 | B1 | * | 10/2001 | Karg et al. ............... 24/132 R |
| 6,390,501 | B1 | * | 5/2002 | Greib et al. ............. 280/743.2 |
| 2002/0096871 | A1 | * | 7/2002 | Pinsenschaum et al. |
| 2002/0117840 | A1 | * | 8/2002 | Dunkle et al. |

* cited by examiner

Primary Examiner—Robert J. Sandy
Assistant Examiner—Ruth C. Rodriguez
(74) Attorney, Agent, or Firm—Sally J. Brown

(57) ABSTRACT

An anchoring apparatus eliminates the need for an anchor plate and an anti-rattle member. The anchoring apparatus includes a flexible connector member which may be embodied as a strip of fabric material. An end of the connector member is disposed to form a loop and then attach to the remaining body of the connector member. The loop defines an anchor aperture which is configured to receive and retain an anchor bolt. The loop may further be configured with one or more twists to consolidate the connector member around the aperture. The twists allow the aperture to better engage and retain the anchor bolt due to the higher concentration of material. The attachment of the end to the connector member ensures retention of the twists in the loop. Attachment of the end is achieved by use of a fastener which may be embodied as stitches, adhesives, rivets, clips, staples and so forth.

10 Claims, 4 Drawing Sheets

ANCHORING ATTACHMENT APPARATUS

BACKGROUND OF THE INVENTION

1. Field of the Invention

The present invention relates to safety restraint devices and, more specifically, to attachments for securing safety restraint devices.

2. Technical Background

Seat belt harnesses are known to increase the safety of occupants in various motorized vehicles. Seat belt use is often cited as being the most useful line of defense in reducing accident injury. The recognition of seat belts has been reflected in safety programs advocating their use and state legislation mandating their use. Seat belts vary in their configuration but one of the most common seat belts is the lap belt harness. The lap belt includes right and left belts which traverse an occupant's lap and are secured to each other proximate to the occupant's mid abdomen. Securement of the lap belts is achieved through the use of a buckle which enables fastening to secure an occupant. Such lap belts may be found in almost all seats in automobiles and planes throughout the world.

Although conventional lap belt apparatuses are well used and accepted they do not limit movement of an occupant's head and torso. Thus, although the lower body is restrained, the upper body will experience rapid and dangerous movement during an accident. This is particularly dangerous for passengers in the front seat of an automobile who may strike the dashboard or windshield during an accident.

An improvement therefore is to introduce shoulder straps and harnesses to limit upper body movement. Single shoulder straps which traverse diagonally across an occupant's body are used in automobiles and aircraft throughout the world. To a lesser extent, double shoulder straps which traverse vertically across an occupant's upper body are also widely used in vehicles. Double shoulder straps provide additional contact with the upper torso to further limit upper body movement and provide additional safety. Seat belt apparatuses which incorporate double shoulder straps and lap belts are commonly referred to as four point seat belt systems.

Another well known and accepted safety restraint device is the inflatable airbag. Inflatable airbags have become very popular in their use in motor vehicles and have been attributed with preventing numerous deaths in accidents. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one airbag module or two. The ECU is usually installed in the middle of an automobile, between the passenger and engine compartment. If the vehicle has a driver bag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousands of a second and deflated within two tenths of a second.

A common feature of seat belt and air bag systems is that both require secure anchoring of their respective members. A seat belt must obviously be anchored in order to restrain a passenger. An airbag must be anchored in one or more places so that it is restrained during its deployment. Airbag anchoring further serves to direct the position of the inflated airbag to an optimal position. For example, side mount airbags and knee airbags must be directed to certain positions to impact intended locations of an occupant's body.

For anchoring, a flexible connecting member, such as a tether, may be attached at one end to a member of the seat belt or air bag system. The connecting member is then secured at an opposing end to a fixed member such as a bolt secured to the vehicle. Although the point of inflation of an airbag is firmly anchored, additional tether anchors may further be used to provide additional restraint. For example, the bottom edges of an airbag may be anchored by tethers to pull tight across a bottom panel of the airbag during inflation. The side panels of an airbag may also be anchored by tethers to tightly restrain the side panels during inflation and direct the inflated position of the airbag.

One method for anchoring the connecting member is to thread the connecting member through an opening in a plastic or metal anchor plate. The end of the connecting member is then sewn to the connecter member to secure the anchor plate. The anchor plate is attached to the sheet metal of a vehicle by a screw or bolt. An anti-rattle member, such as a plastic washer or a wave washer, may also be disposed between the anchor plate and the vehicle. As the name suggests, the anti-rattle member serves to reduce noise created by the vibration of the anchor plate against the sheet metal of the vehicle.

A persistent objective in the industry is to reduce manufacturing costs while maintaining the same quality of performance. It would therefore be an advancement in the art to provide an anchoring apparatus for securing safety restraint devices which eliminated one or more elements while maintaining the same performance level. Such a device is disclosed and claimed herein.

BRIEF SUMMARY OF THE INVENTION

The present invention is an anchoring apparatus which eliminates the need for an anchor plate and an anti-rattle member. The anchoring device is configured for attachment to an anchor bolt which is attached to a secured surface. The anchoring apparatus includes a flexible connector member which may be embodied as a strip of fabric material. An end of the connector member is disposed to form a loop and then attaches to the remaining body of the connector member. The loop formed defines an anchor aperture which may receive and retain the anchor bolt.

The loop may further be configured with one or more twists to consolidate the connector member around the aperture. This allows the aperture to better engage the anchor bolt. The attachment of the end to the connector member ensures retention of the twists in the loop. The attachment of the end is achieved by use of a fastener which may be embodied as stitches, adhesives, rivets, clips, staples and so forth.

In an alternative embodiment, the end may form a knot, a loop, and then attach to the remainder of the connector member. The knot consolidates material in the connector member around the aperture and further defines the aperture. In this embodiment, the loop may further be configured with one or more twists to further consolidate material around the aperture.

The anchoring apparatus is simple to manufacture, effective in performance, and eliminates parts. The anchoring apparatus is therefore more compact and reduces manufacturing and component costs. The invention reduces the number of components, the number of drawings, and the amount of weight.

These and other features, and advantages of the present invention will become more fully apparent from the following description and appended claims, or may be learned by the practice of the invention as set forth hereinafter.

BRIEF DESCRIPTION OF THE SEVERAL VIEWS OF THE DRAWING

In order that the manner in which the advantages and features of the invention are obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE INVENTION

A preferred embodiment of the invention is now described with reference to the FIGS. 1–4, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
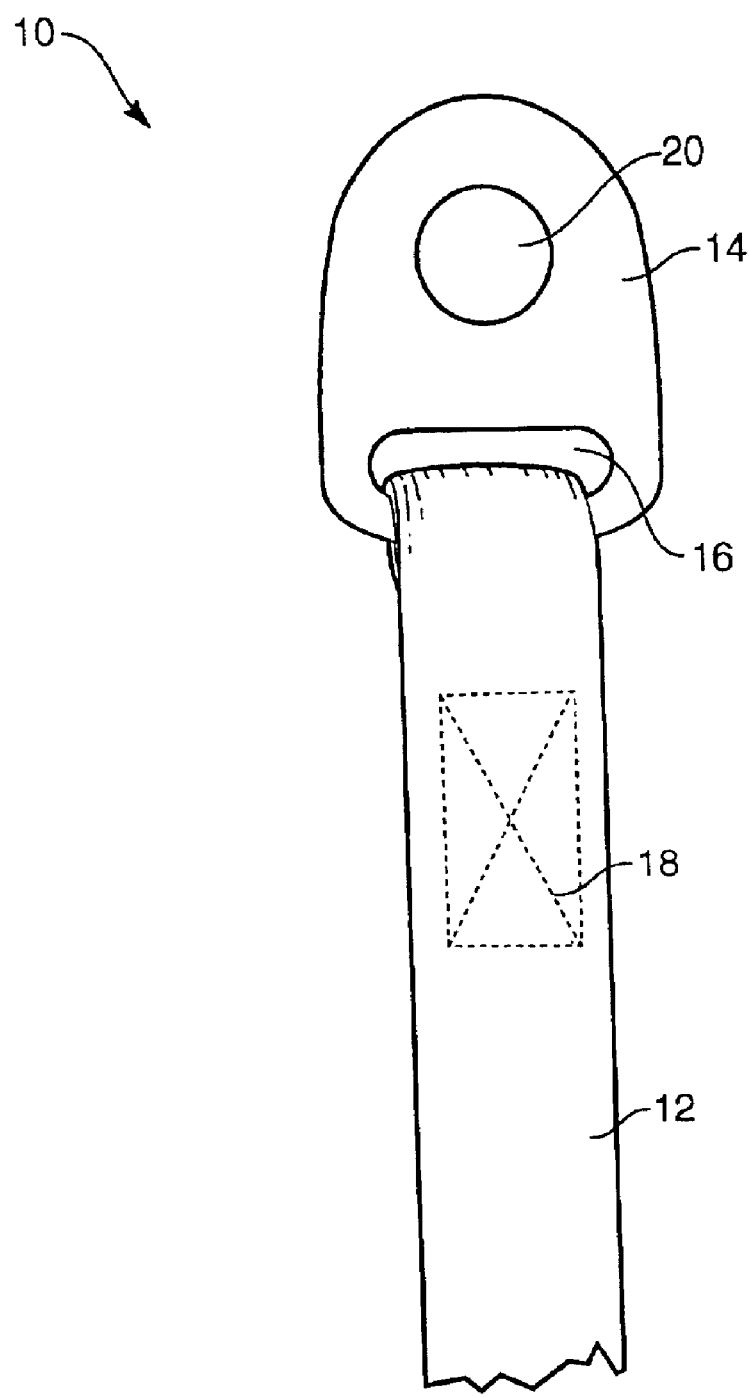
FIG. 1 is a plan view of a conventional anchoring apparatus.

Referring to FIG. 1, a conventional anchoring apparatus 10 is shown. The anchoring apparatus 10 includes a flexible connecting member 12 which is frequently referred to in the industry as a tether. The connecting member 12 may be formed of various fabric materials such as nylon, polyester, dacron or kevlar. The anchoring apparatus 10 further includes an anchor plate 14 which may be formed of metal or plastic. The anchor plate 14 has a receiving aperture 16 for receiving an end of the connecting member 12. After being fed through the receiving aperture 16, the end of the connecting member 12 is attached to the remaining body of the connecting member 12. Attachment of the end to the connecting member 12 may be achieved by a fastener 18 which may be embodied as stitches, rivets, staples, adhesives, clips and so forth.

The anchor plate 14 further includes an anchor aperture 20 which is configured to receive an anchor bolt (not shown). The anchor bolt is threadably secured to a surface of a vehicle to thereby anchor the connecting member 12. Because the anchor plate 14 may vibrate against the anchor bolt or surface, one or more washers may be inserted to reduce the annoying noise.

The opposing end of the connecting member 12 may be attached to a safety restraint device such as a member of a seat belt harness or an air bag system. Securement of a safety restraint device is necessary to ensure the proper function of the device. For example, during deployment of an air bag, the air bag must remain secured in a certain location to ensure that it provides restraint to the occupant. The air bag must further be allowed to expand and move to a predetermined. The flexible connecting member 12 allows for movement of a safety restraint device to a certain location before limiting further movement.

Figure 2:
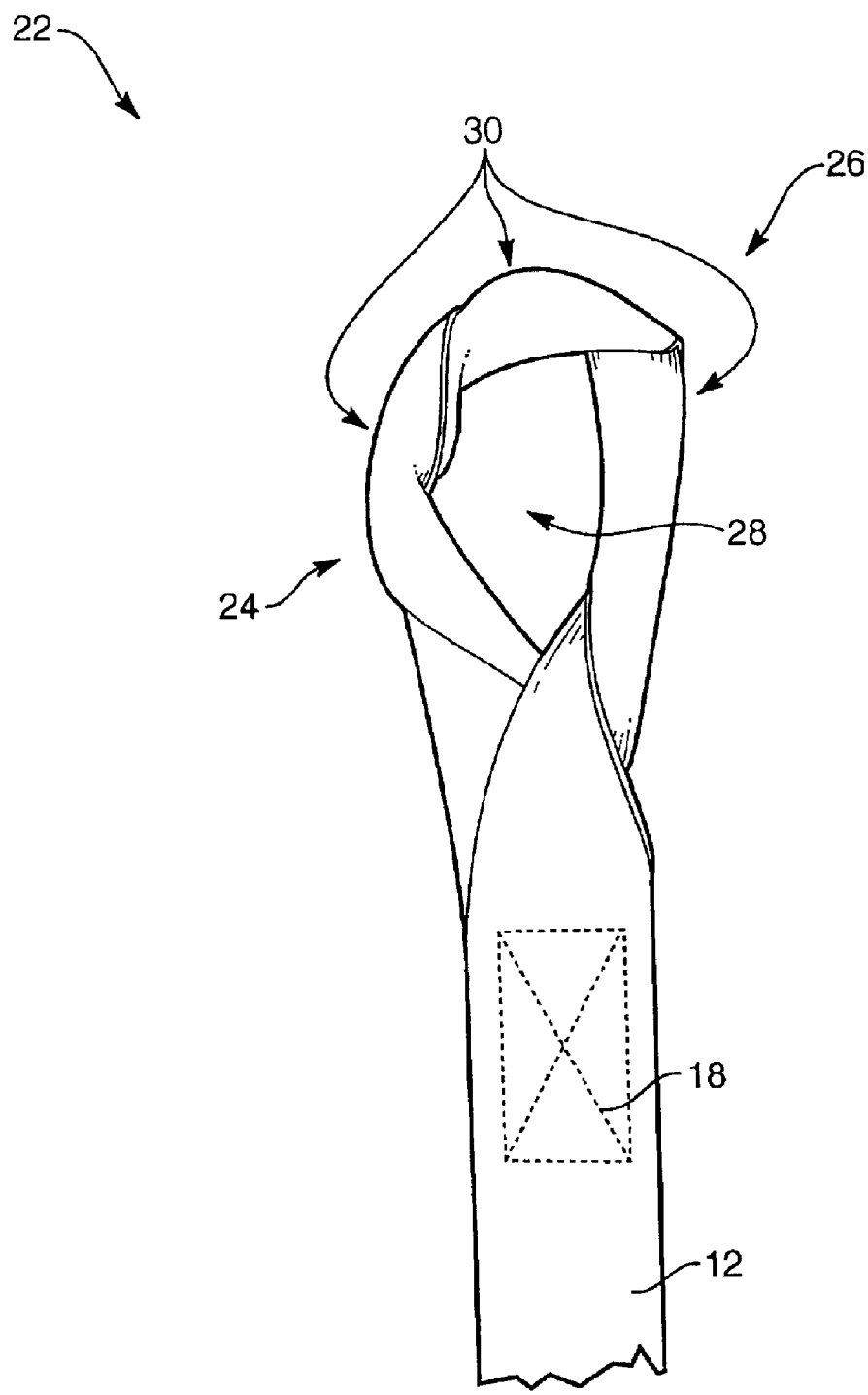
FIG. 2 is a plan view of one embodiment of the anchoring apparatus of the present invention.

Referring to FIG. 2, one embodiment of the anchoring apparatus 22 of the present invention is shown. The anchoring apparatus 22 includes a connecting member 12 which is flexible and may be formed of a fabric material such as that disclosed in the anchoring apparatus 10 of FIG. 1. The connecting member 12 may be configured as a rectangular elongated strip as shown or as a cord or rope. The connecting member 12 has an end 24 which is secured to the body of the connecting member 12 to thereby create a loop 26 and an anchor aperture 28. The securement of the end 24 is achieved by a fastener 18 which may be embodied as stitches, rivets, staples, adhesives, clips and so forth. In the embodiment shown in FIG. 2, the end 24 is attached through stitching 18 which is disposed in a specific pattern as is known in the art.

In creating the loop 26, the connecting member 12 is rotated into one or more twists 30. The number of twists 30 may vary depending on the desired consolidation of the loop 26, size of the aperture 28, and material density of the connecting member 12. The end 24 is secured to prevent the twists 30 from unwinding to thereby ensure the placement of the twists 30. The twists 30 assist in defining the anchor aperture 28 by consolidating the connecting member 12 around the aperture 28. In this manner, the twists 30 strengthen the loop 26 and better allow the anchor aperture 28 to engage an anchor bolt.

Figure 3A:
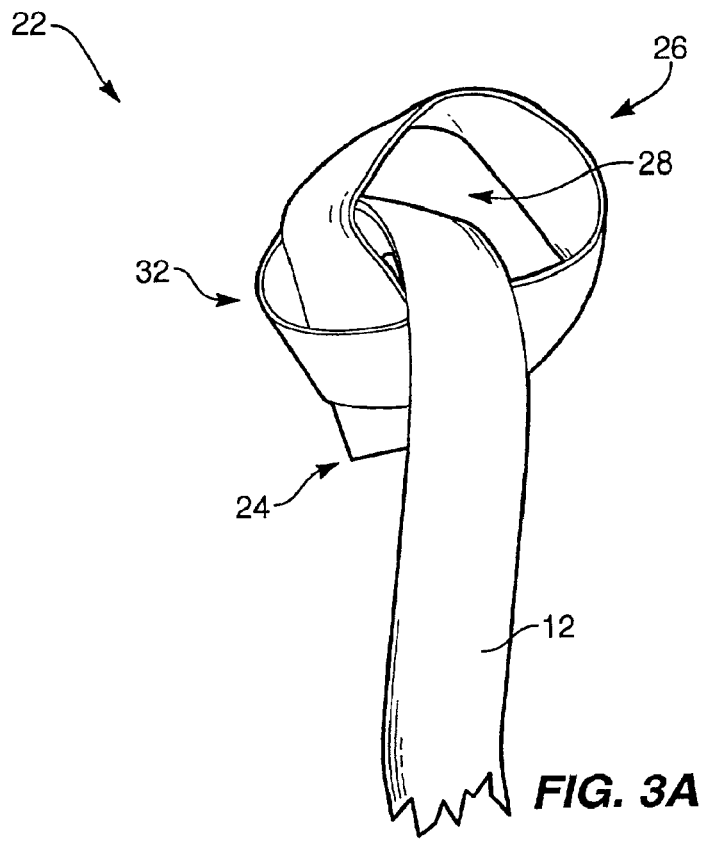
FIG. 3 is a plan view of an alternative embodiment of the anchoring apparatus of the present invention.
Figure 3B:
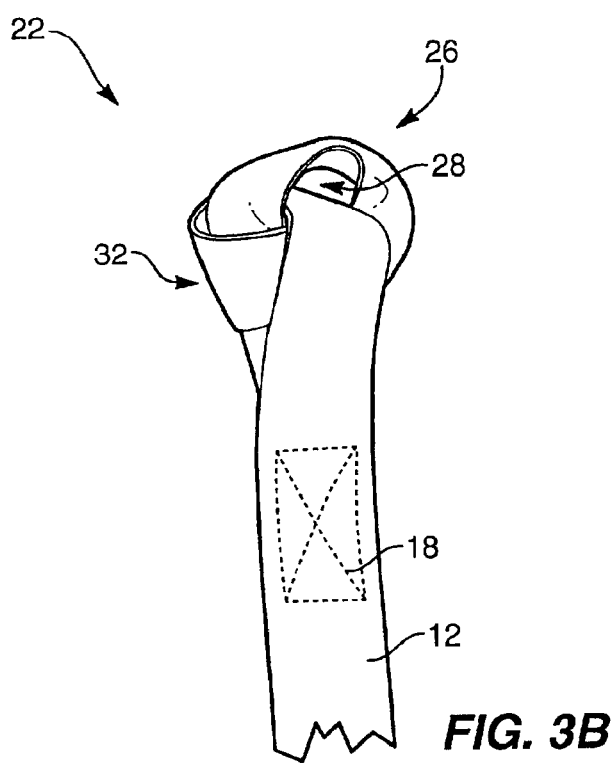

Referring to FIGS. 3A and 3B, an alternative embodiment of the anchor apparatus 22 of the present invention is shown. As in the embodiment of FIG. 2, the anchor apparatus 22 includes a connecting member 12 formed of a flexible fabric material. The connecting member 12 has an end 24 which is secured to the body of the connecting member 12 to thereby create a loop 26 and an anchor aperture 28. The end 24 is secured by a fastener 18 such as previously disclosed in the embodiment of FIG. 2. The connecting member 12 is further configured to form a knot 32 as the end 24 forms the loop 26. The knot 32 may be embodied as a simple slip knot as shown. The knot 32 is fixed as the end 24 is secured to the connecting member 12. One of skill in the art will appreciate that various knots may be used and are included within the scope of the invention.

Similar to the twists 30 in the embodiment of FIG. 2, the knot 32 assists in defining the anchor aperture 28. The knot 32 further strengthens the loop 26 by consolidating material of the connecting member 12 around the aperture 28. This provides superior retention and engagement of the aperture 28 to an anchor bolt. The loop 26 may further be configured with one or more twists 30. The addition of the twists 30 further consolidate the connecting member 12 around the aperture 28 and define the aperture 28.

Figure 4A:
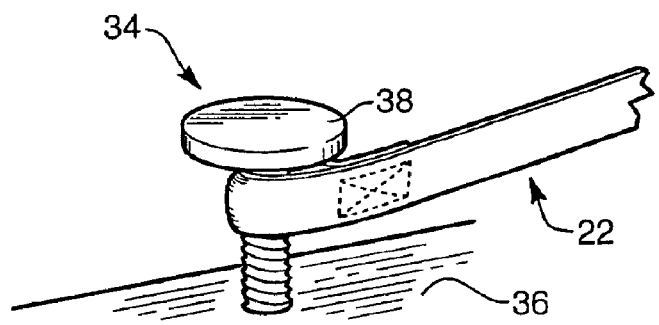
FIG. 4A is a perspective view of one embodiment of the anchoring apparatus of the present invention secured to a fixed member.
Figure 4B:
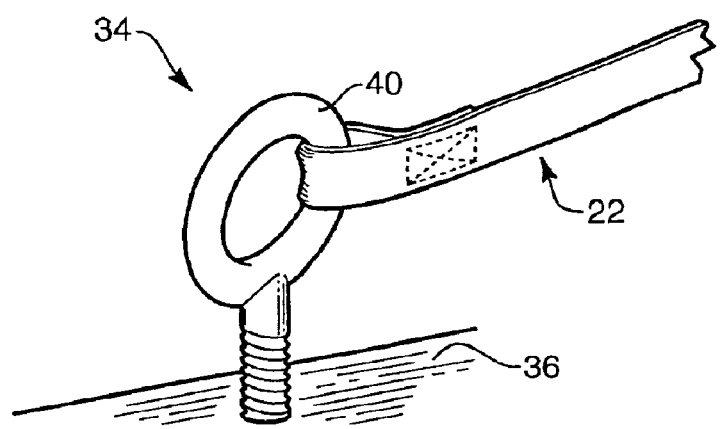
FIG. 4B is a perspective view of an alternative embodiment of an anchoring apparatus of the present invention secured to a fixed member.
Figure 4C:
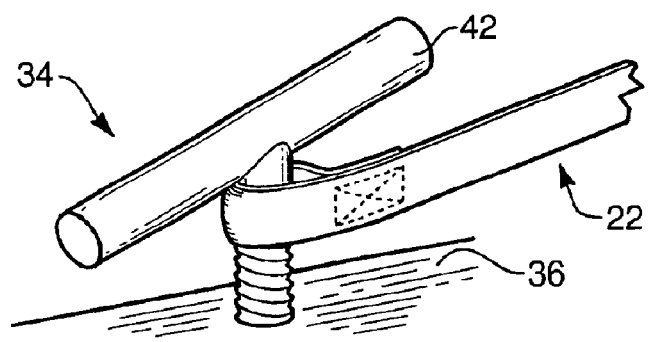
FIG. 4C is a perspective view of an alternative embodiment of an anchoring apparatus of the present invention secured to a fixed member.

Referring to FIGS. 4A to 4C, the anchor apparatus 22 is shown in engagement with an anchor bolt 34. The anchor bolt 34 may be embodied in various forms and is threaded or riveted into an anchoring surface 36. The anchoring surface 36 may be embodied as sheet metal in the body of the vehicle or seat. In FIG. 4A, the anchor bolt 34 is embodied as having a circular, flat head 38. The head 38 is configured to have a diameter greater than the aperture 28 to thereby secure the anchoring apparatus 22. In FIG. 4B, the anchor bolt 34 is embodied with an O-ring 40 to which the anchoring apparatus 22 is secured. In FIG. 4C, the anchor bolt 34 is configured with T-shaped head 42 to which the anchoring apparatus 22 is attached. Although some embodiments for the anchor bolt 34 have been shown, one of skill in the art will appreciate that the anchoring apparatus 22 is suitable for use with anchoring bolts of various embodiments.

The opposing end (not shown) of the connecting member 12 is secured to a safety restraint device such as a component of a seat belt harness or an air bag system. Securement may be achieved through the use of fasteners such as those disclosed in reference to fastener 18. Thus secured, the anchoring apparatus 22 provides limited and flexible movement of a safety restraint device. This ensures that the safety restraint device will be confined to a particular location as intended. The safety restraint device is further prevented from free movement during an accident situation which may cause injury to an occupant.

The anchoring apparatus 22 of the present invention is advantageous in that it eliminates the need for an anchor plate 14 and an anti-rattle device. The anchoring apparatus 22 is therefore more compact and reduces manufacturing and component costs. The invention reduces the number of components, the number of drawings, and the amount of weight. As a result, the invention improves mistake-proving on the assembly line in manufacturing. The anchoring apparatus 12 further performs at an equivalent level to conventional apparatuses.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An anchoring apparatus for attachment to a vehicle safety device and to an anchor bolt, comprising:
    a flexible connector member attachable to a vehicle safety device and to an anchor bolt having,
        an end, and
        a loop defining an aperture which receives and retains the anchor bolt, the loop configured with a twist; and
    a fastener disposed to secure the end to the connector member and retain the twist in the loop.

2. The anchoring apparatus of claim 1 wherein the connecting member comprises a fabric material.

3. The anchoring apparatus of claim 1 wherein the fastener comprises stitches.

4. The anchoring apparatus of claim 1 wherein the loop is configured with a plurality of twists, the fastener disposed to secure the end and retain the twists in the loop.

5. The anchoring apparatus of claim 1 wherein the vehicle safety device is an airbag system.

6. The anchoring apparatus of claim 1 wherein the vehicle safety device is a seat belt harness.

7. A method for making an anchoring apparatus and attaching the apparatus to a vehicle safety device and to an anchor bolt, the method comprising:
    providing a flexible connector member having an end;
    forming a loop in the connector member;
    forming a twist in the loop;
    securing the end to the connector member to retain the twist in the loop and to define an aperture to receive and retain the anchor bolt;
    engaging the aperture with the anchor bolt; and
    attaching the connector member to the vehicle safety device.

8. The method for making an anchoring apparatus of claim 7, further comprising forming a plurality of twists in the loop, and wherein the step of securing the end further includes retaining the twists in the loop.

9. The method for making an anchoring apparatus of claim 7, wherein the connector member comprises a fabric material.

10. The method for making an anchoring apparatus of claim 7, wherein securing the end comprises stitching the end to the connector member.

* * * * *